United States Patent
Roberts

(10) Patent No.: US 7,389,325 B2
(45) Date of Patent: Jun. 17, 2008

(54) BRIDGE FOR LINKING TWO PUBLISH/SUBSCRIBE MESSAGE BROKERS

(75) Inventor: Matthew Roberts, Southhampton (GB)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 11/163,407

(22) Filed: Oct. 18, 2005

(65) Prior Publication Data

US 2007/0016910 A1 Jan. 18, 2007

(30) Foreign Application Priority Data

Jul. 13, 2005 (GB) ................................. 0514362.3

(51) Int. Cl.
*G06F 15/16* (2006.01)
(52) U.S. Cl. ...................... 709/206; 709/207; 719/313
(58) Field of Classification Search ........ 709/200–207, 709/217–227; 719/313
See application file for complete search history.

(56) References Cited

U.S. PATENT DOCUMENTS

| | | | |
|---|---|---|---|
| 2003/0033212 A1* | 2/2003 | Sandhu et al. ................ | 705/26 |
| 2004/0139166 A1* | 7/2004 | Collison ...................... | 709/207 |
| 2006/0031076 A1* | 2/2006 | Lei et al. ....................... | 705/1 |

OTHER PUBLICATIONS

Postel, Jonathan B., "Simple Mail Transfer Protocol," Information Sciences Institute University of Southern California, http://www,ietf.org/rfc/rfc0821.txt, Aug. 1992.
"SonicMQ V5 Bridge for JMS User's Guide" Sonic Software Corporation, Jun. 2003.

* cited by examiner

*Primary Examiner*—Moustafa M Meky
(74) *Attorney, Agent, or Firm*—Joseph E. Bracken

(57) ABSTRACT

There is disclosed a method, computer program and bridge for linking two publish/subscribe message brokers together. A subscription is made to receive request messages on one or more topics from a first broker. A subscription is made to receive all messages published at either the first or the second broker to a replyto topic including a bridge identifier. A request message is received from the first broker, the request message specifying a temporary replyto topic on which responses to the request should be published. The temporary reply to topic is modified to specify a bridge identifier. The modified request message is forwarded to a second broker. A response to the request is received from the second broker, the response being published on the replyto topic including the bridge identifier. The bridge receives the response as a result of the subscription to receive all messages published to a topic including the bridge identifier. The response is forwarded to the first broker.

3 Claims, 7 Drawing Sheets

Bridge 150

| Topic | Direction | From | To |
|---|---|---|---|
| building/quotes/roof | Broker A <-> Broker B | Topic space 110 | Topic space 130 |
| building/quotes/windows | Broker A <- Broker B | Topic space 130 | Topic space 120 |
| building/quotes/brickwork | Broker A <- Broker B | Topic space 120 | Topic space 140 |
| roofquotes | Broker A <-> Broker B | Topic space 140 | Topic space 110 |

Figure 3

BRIDGE FOR LINKING TWO PUBLISH/SUBSCRIBE MESSAGE BROKERS

The invention relates to the field of publish/subscribe (pub/sub) and more particularly to the bridging of two pub/sub message brokers in order to create a single messaging domain.

BACKGROUND OF THE INVENTION

Publish/subscribe data processing systems have become very popular in recent years as a way of distributing data messages. Publishers are not concerned with where their publications are going, and subscribers are not interested in where the messages they receive have come from. Instead, a message broker typically assures the integrity of the message source, and manages the distribution of the message according to the valid subscriptions registered in the broker.

FIG. 1 illustrates a typical publish/subscribe data processing system according to the prior art. A message broker 15 has an input mechanism 20 which may be, for example, an input queue or a synchronous input node by which messages are input when they are sent by a publisher 5; 10 to the message broker. A published message is fetched from the input mechanism by a controller 40 and processed to determine, amongst other things, to which subscribers 60; 65; 70 the message should be sent.

Message topics typically provide the key to the delivery of messages between publishers and subscribers. The broker attempts to match a topic string on a published message with a list of clients who have subscribed to receive publications including that topic string. A matching engine 30 is provided in the message broker for this very purpose. When the subscriber registers, it must typically specify a means by which it wants to receive messages (which may be a queue or other input mechanism) and a definition of the types of messages that it is interested in. A subscriber can specify, for example, that it wishes to receive messages including a topic string such as "employee/salary" and any messages matching that topic string will be identified and forwarded on to the subscriber via an output mechanism 50. (Note, there may be more than one input and output mechanism to and from which messages are received and sent by the message broker.)

Publishers and subscribers may also interact with a homogeneous network of brokers (in which each broker is a linked installation of the same product), each one of which propagates subscriptions and forwards publications to other brokers within the network. In this way the network of brokers may act as a single broker.

A publish/subscribe system may however comprise two messaging brokers (A and B) which may be installations of different products. With the help of bridging technology, it is also possible to join the two brokers together using only the public publisher and subscriber APIs in order to present a unified publish/subscribe messaging system in which subscribers attached to both brokers can receive publication messages unaware of the broker to which the publisher was connected. This allows the heterogeneous brokers to be viewed as a single messaging domain, which is a key goal of application integration technologies.

Messages published to either of the brokers may also include a topic on which a reply message should be published in order to be processed by the original publishing application. This is known as request/reply messaging. Like the topic on which the original message is published, the reply topic is defined in the original application, and so the administrator can examine the application code to determine which topic is being used for replies, and configure an appropriate topic mapping in the bridging application to enable the reply message to return to the correct side of the bridge to be processed by the requester.

It is not however possible to define this topic mapping if a temporary topic is being used as the reply topic. Temporary topics are a facility which may be provided by a messaging broker which dynamically generates a unique topic name to be used by the requesting application.

Temporary topics are normally used as reply destinations in situations where the requesting application:

(i) Cannot rely on the existence of a pre-defined resource (e.g. topic) that could be used to receive the response (a reduced configuration overhead).

(ii) Wishes to avoid other applications being able to receive the reply message (better security).

(iii) Wishes to avoid having to filter the response message from other messages published on the same topic (better efficiency).

The name of the temporary topic is not known until the point at which it is created, and the existence of the temporary topic lasts only until the requesting application is closed. Since the name of the temporary topic is not known in advance, it is not possible to predefine a topic mapping that would enable the reply message to return to the requesting application. Thus a response will never be received. This prevents the two brokers from being viewed as a single messaging domain since this basic operation will only work correctly if the requesting and responding applications are connected to the same broker.

SUMMARY OF THE INVENTION

According to a first aspect, there is provided a method for a bridge linking two publish/subscribe message brokers together, the method comprising: subscribing to receive request messages on one or more topics from a first broker; subscribing to receive all messages published at either the first or the second broker to a replyto topic including a bridge identifier; receiving a request message from the first broker, the request message specifying a temporary replyto topic on which responses to the request should be published; modifying the temporary replyto topic to specify a bridge identifier; forwarding the modified request message to a second broker; receiving a response to the request from the second broker, the response being published on the replyto topic including the bridge identifier, the bridge receiving the response as a result of the subscription to receive all messages published to a topic including the bridge identifier; and forwarding the response on to the first broker.

Preferably the response message is modified to refer to the temporary topic in its original unmodified form prior to forwarding the response on to the first broker. This is not however essential since the first broker may contain rules enabling it to determine which topic to associate the reply message with.

In a preferred embodiment a mapping table is consulted in order to determine where to forward a message to. This can apply to both request and response messages.

A subscription is made to receive all messages published at either the first or the second broker and including the bridge identifier. This is preferably done at startup and only one subscription (e.g. a wildcard subscription) needs to be created to cope with message replies. This avoids the need to create a subscription for every temporary topic encountered. This is advantageous because there is less of an administration cost involved with subscription requests and deletion of such subscriptions when they expire. The runtime cost of matching a publication against subscriptions etc. is also reduced.

According to a second aspect, there is provided a bridge for linking two publish/subscribe message brokers together, the bridge comprising: means for subscribing to receive request messages on one or more topics from a first broker; means for subscribing to receive all messages published at either the first or the second broker to a replyto topic including a bridge identifier; means for receiving a request message from the first broker, the request message specifying a temporary replyto topic on which responses to the request should be published; means for modifying the temporary replyto topic to specify a bridge identifier; means for forwarding the modified request message to a second broker; means for receiving a response to the request from the second broker, the response being published on the replyto topic including the bridge identifier, the bridge receiving the response as a result of a subscription to receive all messages published to a topic including the bridge identifier; and means for forwarding the response on to the first broker.

According to a third aspect, there is provided a computer program for a bridge linking two publish/subscribe message brokers together, the computer program comprising program code means adapted to perform, when the program is run on a computer, the method steps of: subscribing to receive request messages on one or more topics from a first broker; subscribing to receive all messages published at either the first or the second broker to a replyto topic including a bridge identifier; receiving a request message from the first broker, the request message specifying a temporary replyto topic on which responses to the request should be published; modifying the temporary replyto topic to specify a bridge identifier; forwarding the modified request message to a second broker; receiving a response to the request from the second broker, the response being published on the replyto topic including the bridge identifier, the bridge receiving the response as a result of the subscription to receive all messages published to a topic including the bridge identifier; and forwarding the response on to the first broker.

BRIEF DESCRIPTION OF THE DRAWINGS

A preferred embodiment of the present invention will now be described, by way of example only, and with reference to the following drawings:

FIGS. 2 and 3 show a system in which two heterogeneous message employing static replyto topics are bridged.

DETAILED DESCRIPTION

As discussed in the background section, brokers in a publish/subscribe messaging system may be bridged together.

The linking of the two brokers may be achieved by the creation of a bridging application (bridge) which reads a static list of topic definitions (mappings) defined by an administrator, makes the appropriate subscriptions and registers the necessary publishers. Such subscriptions and registrations enable messages to flow between the two brokers in the direction(s) indicated by the administrator on the chosen topics. Forming part of each topic mapping is information specific to the broker type on each end of the bridge. This information controls how subscriptions are made, and where publications are sent. The set of bridged topics is may be chosen by the administrator to be the minimal set of topics that are required to be available to subscribers attached to both brokers. This enables the joining of the two brokers to be carried out without re-publishing unnecessary messages, which might lead to excessive network traffic or load on the hardware hosting the brokers.

Figure 1:
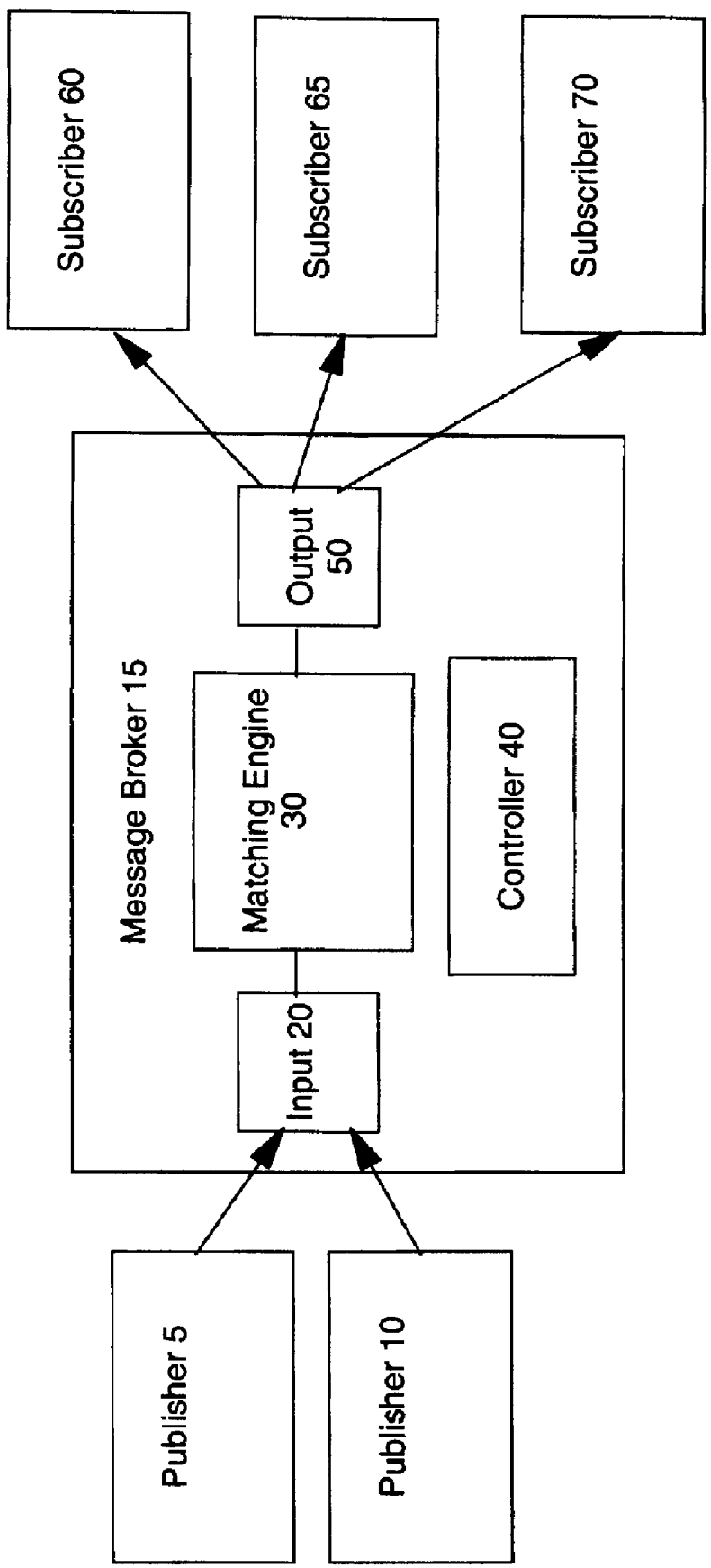
FIG. 1 illustrates a prior art publish subscribe system.
Figure 2:
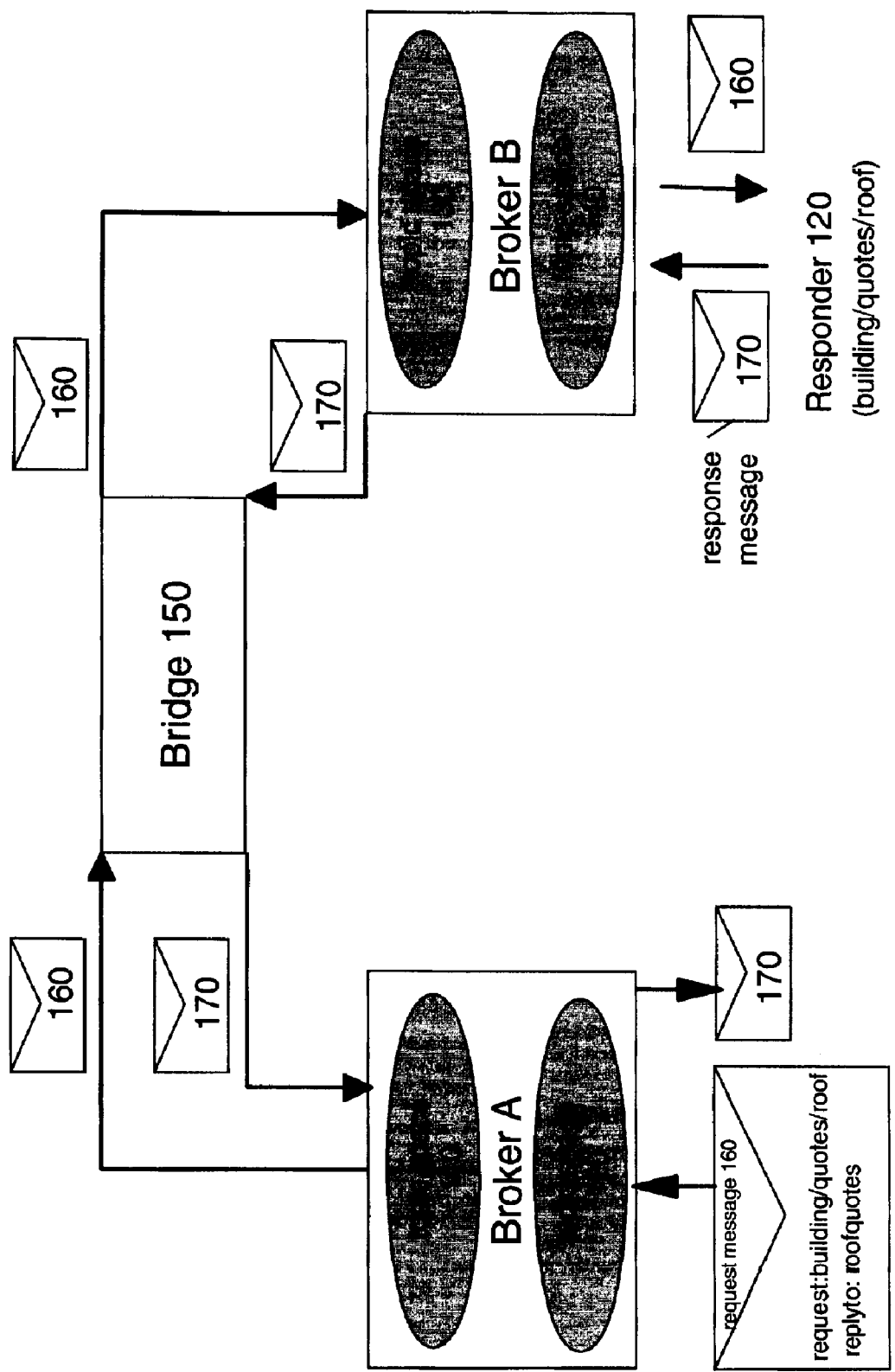
Figure 4A:
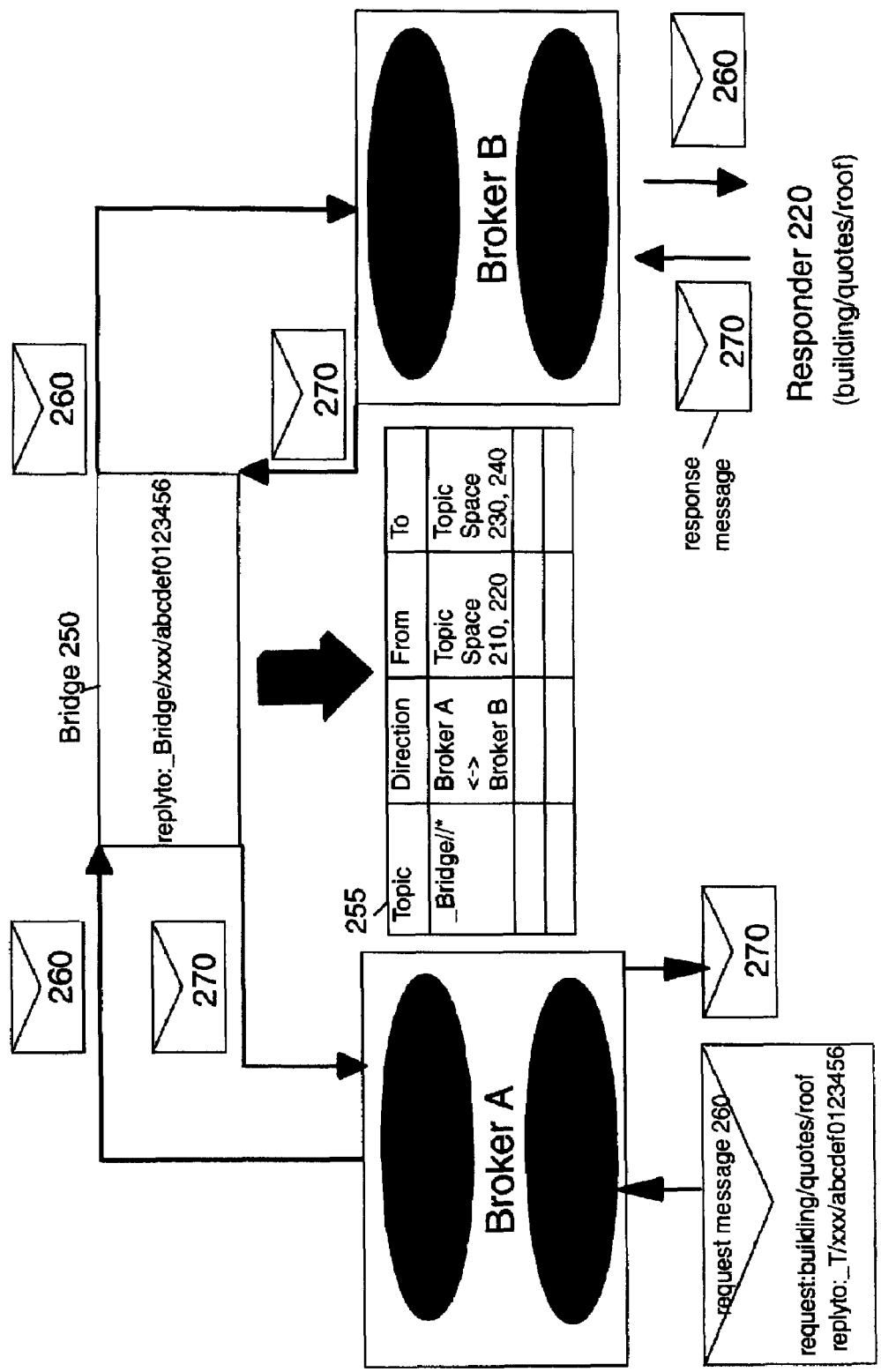
FIGS. 4a, 4b, 4c and 4d illustrate the components and processing of a preferred embodiment of the present invention.
Figure 4B:
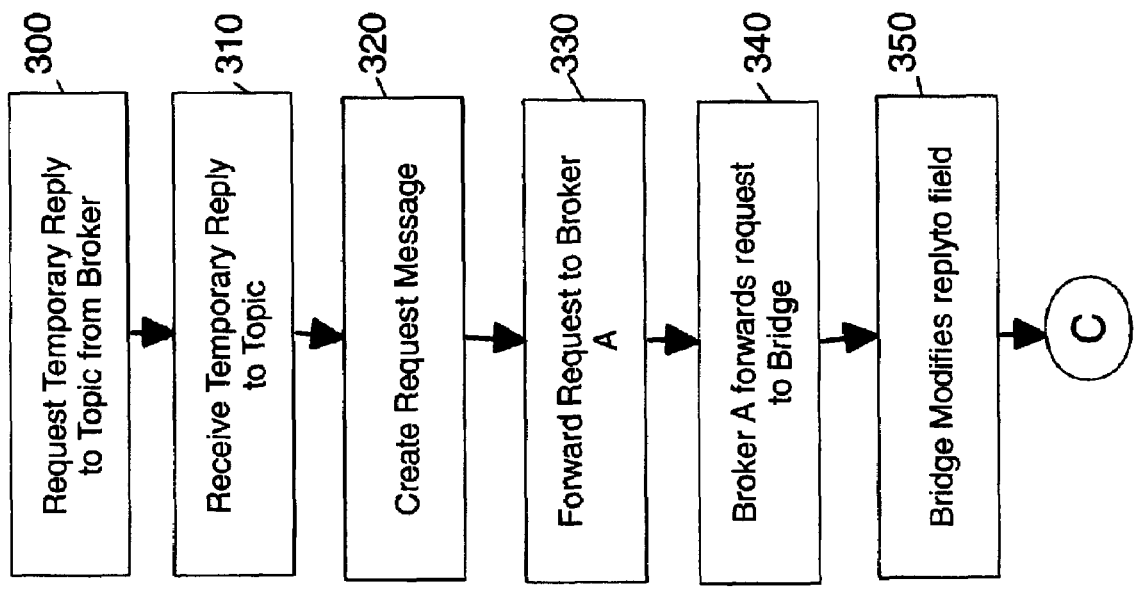
Figure 4C:
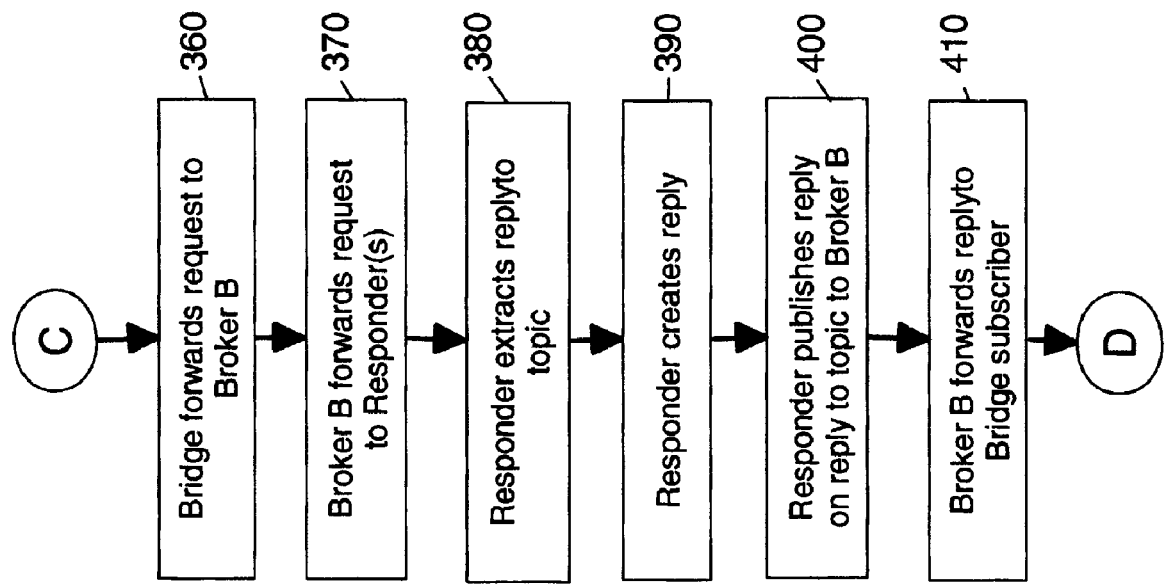
Figure 4D:
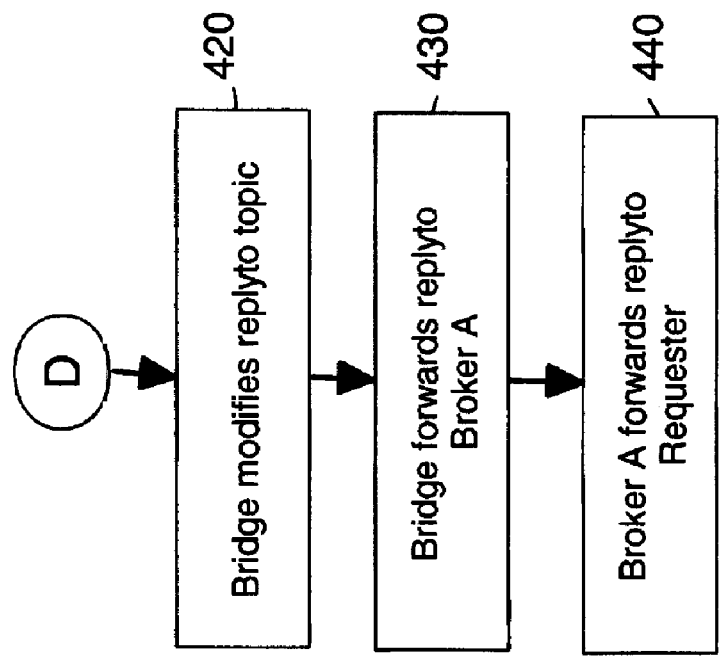

FIG. 2 exemplifies such a system. Requester 100 creates a request message 160 requesting roofing building quotes. A static (i.e. predefined) "replyto" topic of "roofquotes" is predefined by the application and is specified as part of the request.

Requester 100 sends its request 160 to Broker A (i.e. publishes on a building/quotes/roof topic). Broker A contains two topic spaces 110 and 120. A topic space defines a set of topics to which subscribers can subscribe and to which publishers can publish. Although this is not shown in the figure, the requester will specify the appropriate topic space containing the building/quotes/roof topic when publishing request 160 to broker A.

A bridging application 150 joins Broker A to a second broker Broker B in order to effectively create (from the point of view of publishers and subscribers) a single broker. In order to achieve this, the bridge subscribes to receive publications on certain topics and dependent upon the origin of any messages received, forwards the messages on to the appropriate broker. Such subscriptions are registered with the appropriate broker.

A mapping table at the bridge (see FIG. 3) defines which topics are subscribed to and where the bridge is to forward any messages published on those topics.

Thus, for example, the mapping table owned by bridge 150 specifies the topic building/quotes/roof and that it is to forward messages in either direction between the two brokers (dependent upon where a message originates from). The table also specifies the topic spaces between which messages should be communicated.

It will be appreciated from FIG. 3 that messages may equally flow in one direction only. For example, a request message relating to window quotes should be received from Broker B only (topic space 130) and the bridging application will forward this information onto Broker A (Topic Space 120).

In the particular example, request message 160 is received by Broker A and is forwarded onto bridge 150 as a result of the bridge's subscription to the building/quotes/roof topic. The bridge uses its mapping table to determine that the request message should be forwarded onto Broker B (topic space 130).

A responder 120 has subscribed to receive roof quote requests and consequently receives message 160. The request message contains an appropriate "replyto" to which the responder 120 publishes its response at Broker B. The appropriate topic space for the replyto topic may be specified in the request. Of course some brokers may not understand the concept of a topic space. A broker may use another mechanism via which messages are received (e.g. a queue).

Again the bridge has subscribed to receive such reply publications and the mapping table defines that the bridge should forward such publications to Broker A, topic space 110, for forwarding to requester 100 (see FIG. 3).

It should thus be appreciated that the process works well when a requester specifies a static replyto topic which can be predefined (e.g. at setup by an administrator) in a bridge mapping table.

The situation becomes more problematic when temporary replyto topics are used. As discussed above temporary topics are dynamically created (upon request by a requesting application) and consequently the name of the temporary topic is not known until the point at which it is created.

The present invention addresses the problem of temporary replyto topics and a preferred embodiment of the present invention will be discussed with reference to FIGS. 4*a*, 4*b*, 4*c* and 4*d*.

A requester 210 requests a temporary replyto topic from broker A (step 300). Broker A assigns a replyto topic and it is received by the requester 210 at step 310. In this embodiment a new topic space is created for each assigned temporary topic (this is however implementation specific.) Requester 210 then creates a request message 260 at step 320. In addition to its payload (not shown), the request message 260 indicates a request topic to which the request is to be published (building/quotes/roof) and a replyto topic to which replies should be addressed. By way of example, all temporary topics might consist of some way of identifying the string as a temporary topic (e.g. an _T prefix) and then the unique part of the temporary replyto topic which might be some form of UUID (e.g. a0cl2ffbbccaa6573567427). Thus a temporary topic may look as follows; _Ta0cl2ffbbccaa6573567427".

The request is then published to the indicated request topic at Broker A (step 330). (Note, for each topic, an appropriate topic space may also be specified. This does of course depend upon whether the broker supports the concept of a topic space.)

Bridge 250 links Broker A to Broker B. This is useful because responder and requester applications may attach to either broker.

The bridge subscribes on certain topics such as building/quotes/roof. In other words, on all topics for which messages are to pass between the two brokers. As a result of the bridge's subscription on building/quotes/roof, Broker A forwards request message 260 thereto (step 340).

Bridge 250 receives the request message and modifies the replyto field at step 350 such that it includes the following:

1) A constant identifier that identifies the modified replyto topic as being owned by the bridging application (e.g. _Bridge);

2) Routing information inserted by the bridging application that contains all the necessary information required to route any reply messages back to the original broker (e.g. topic space, queue etc.). This information is dependent upon the type of broker to which the response is being delivered In one implementation the publication originates from the same topic space to which replies should be addressed. In another embodiment, the requester may actually specify the routing information; and 3) The original temporary reply topic (e.g. _Ta0cl2ffbbccaa6573567427).

Thus the original temporary topic of _Ta0cl2ffbbccaa6573567427 now becomes _Bridge/_Ta0cl2ffbbccaa6573567427. Note, the _T denoting in this example that this is a temporary topic could be deleted rather than replaced by _Bridge. The bridge is configured to understand/is informed of the format of a temporary topic so that such temporary topics can be modified as discussed above.

The request message is then forwarded on to Broker B (step 360) who forwards this onto the responder (step 370).

Responder 220 extracts the replyto topic from the request message at step 380. The responder creates a reply 270 to the request (step 390) and publishes the reply on the specified replyto topic to broker B (step 400).

The bridge has subscribed with broker B to receive any messages published on a topic prefixed with _Bridge. Consequently broker B forwards the reply to the bridge (step 410).

As indicated earlier, the bridge has a mapping table which indicates via a set of static mappings how to flow messages between the two brokers (see FIG. 3). In addition the bridge dynamically creates a subscription for all messages published to a topic including the bridge identifier _Bridge 266. The information on how to route the response message is encoded as part of the modified reply to topic. This subscription is in one embodiment, held separately from the static mapping table.

The dynamic subscription indicates that the bridge should forward information including the identifier on to either of broker A or broker B. If a message is received from broker B on topic space 240, it should be forwarded to broker A, topic space 230. If a message is received from broker A on topic space 220, it should be forwarded to broker B on topic space 230 etc.

Before forwarding a message on however, the bridge modifies (at step 420) the reply to topic back to its original form i.e. _Ta0cl2ffbbccaa6573567427 based on some rules.

The replyto topic is modified because this is the form that the broker which allocated the replyto topic understands.

Having modified the replyto topic, the bridge forwards the reply to Broker A (step 430) which then forwards the reply on to the Requester (step 440).

Thus, in summary the bridge application observes each temporary topic as it crosses the 'bridge', and modifies it to a form in which replies published on the modified topic can be automatically received by the bridging application and returned to the original broker without requiring any stored state on a per-temporary-topic basis.

This approach solves the problem of being able to return reply messages to the requesting application, while removing the responsibility for defining a topic mapping from the administrator. This is important because it is extremely difficult to define such topic mappings since they are assigned dynamically and are not known at setup time. Importantly it also produces a scenario in which there is a fixed (and insignificant) cost to routing the reply messages independent of the number of temporary reply topics that are used by the applications. This cost is a single subscription capable of returning all temporary topic reply messages.

It should be appreciated that the brokers bridged by the bridging application may be heterogeneous or homogenous.

Rather than subscribing to receive all messages simply including the bridge identifier (_bridge/*), a subscription could be made per topic space—e.g. _bridge/topicspace1/*; _bridge/topicspace2/* etc. This however requires storing more state information.

What is claimed is:

1. A method for a bridge linking two publish/subscribe message brokers together, the method comprising:

subscribing to receive request messages on one or more topics from a first broker;

subscribing to receive all messages published at either the first or the second broker to a replyto topic including a bridge identifier;

receiving a request message from the first broker, the request message specifying a temporary replyto topic on which responses to the request should be published;

modifying the temporary replyto topic to specify a bridge identifier; forwarding the modified request message to a second broker;

receiving a response to the request from the second broker, the response being published on the replyto topic including the bridge identifier, the bridge receiving the response as a result of the subscription to receive all messages published to a topic including the bridge identifier; and forwarding the response on to the first broker.

2. The method of claim 1, further comprising the step of:

modifying the response message to refer to the temporary topic in its original unmodified form prior to forwarding the response on to the first broker.

3. The method of claim 1 or 2 comprising:

consulting a mapping table in order to determine where to forward a message to.

* * * * *